United States Patent [19]

Inoue

[11] Patent Number: 5,204,667
[45] Date of Patent: Apr. 20, 1993

[54] INDICATION DISPLAY UNIT FOR VEHICLES

[75] Inventor: Tai Inoue, Susono, Japan

[73] Assignee: Yazaki Corporation, Tokyo, Japan

[21] Appl. No.: 798,055

[22] Filed: Nov. 27, 1991

Related U.S. Application Data

[63] Continuation of Ser. No. 302,649, Jan. 27, 1989, abandoned.

[51] Int. Cl.$^5$ .......................................... G02D 27/14
[52] U.S. Cl. ...................................... 340/705; 340/980
[58] Field of Search .................. 340/705, 401, 950; 359/839–844, 859, 630–633; 353/13, 14; 362/83.1, 142; 439/13, 31, 34

[56] References Cited

U.S. PATENT DOCUMENTS

| | | | |
|---|---|---|---|
| 4,327,316 | 4/1982 | Fujikubo et al. | 136/291 |
| 4,417,775 | 11/1983 | Sakurai et al. | 439/13 |
| 4,445,228 | 4/1984 | Bruni | 350/631 |
| 4,547,027 | 10/1985 | Scheibenreif | 439/13 |
| 4,664,475 | 5/1987 | Ferrer | 350/174 |
| 4,669,810 | 6/1987 | Wood | 350/174 |
| 4,831,366 | 5/1989 | Iino | 353/14 |
| 4,975,062 | 12/1990 | Evans et al. | 439/31 |
| 5,056,890 | 10/1991 | Iino et al. | 340/705 |

FOREIGN PATENT DOCUMENTS

| | | | |
|---|---|---|---|
| 142143 | 9/1985 | Japan | 340/705 |
| 60-152544 | 10/1985 | Japan . | |
| 0050239 | 3/1987 | Japan | 340/705 |
| 2203883 | 10/1988 | United Kingdom | 340/705 |

*Primary Examiner*—Alvin E. Oberley
*Assistant Examiner*—Steven J. Saras
*Attorney, Agent, or Firm*—Nikaido, Marmelstein, Murray & Oram

[57] ABSTRACT

An indication display unit for a vehicle has a reflecting member having an electric unit, a supporting member having a connecting portion electrically connectable with and disconnectable from the electric unit. The support member removably holds the reflecting member at a position of an instrument panel of a dash board with the reflecting surface thereof directed to a driver's seat. An indicating device is located at any position other than the dash board with the indicating surface thereof directed to the reflecting surface so as to project various operational information indicated on the indicating surface to the reflecting surface. Since the reflecting member of the present invention is provided with an electric unit and a removable connecting portion, it can be easily replaced by another type of reflecting member. Furthermore, by providing a solar cell at the rear surface of the reflecting member, the lowered electromotive force caused by self-discharge of batteries loaded on the vehicle can be somehow compensated.

2 Claims, 12 Drawing Sheets

INDICATION DISPLAY UNIT FOR VEHICLES

This application is a continuation of application Ser. No. 302,649 filed Jan. 27, 1989 now abandoned.

BACKGROUND OF THE INVENTION

1. Field of the Invention

The present invention relates to indication display units for vehicles, and more particularly to an indication display unit for vehicles which displays information concerning driving operation at a position corresponding to an instrument panel on a dash board.

2. Description of the Prior Art

Conventionally, various information concerning driving operation such as the vehicle speed, engine revolutions, residual fuel quantity, time and other various warnings have been indicated by meters, a clock or alarm lamps provided on an instrument panel. Recently, however, in order to ensure sufficient space in a dash board, there has been proposed that a semi-transparent reflecting mirror is located at a position of an instrument panel, and an indicating means for indicating revolution frequency of engine, vehicle speed, residual fuel quantity, etc. to be essentially indicated is mounted on a lower surface of a meter hood, while various warning lamps which are not so essential are located behind the reflecting mirror. With this arrangement, the displayed image from the indicator is reflected on the reflecting mirror, and the images from the warning lamps are transmissively observed through the reflecting mirror (Japanese Utility Model Laid-open Publication No. 60-152544).

In this conventional device, both the transmissive image from the warning lamps and the displayed image from the indicating means are visually observed by the driver. Simultaneously, a sufficient space may be ensured in the dash board by not locating the indicating means behind the instrument panel, namely, in the dash board.

However, as the meter hood is yet present, and the reflecting mirror is located at a position deeply inside the dash board, a sufficient space to be defined in the dash board is limited. Further, the meter hood is intended not only for the location of the meter indicator but also for prevention of reflection of the image from the warning lamps located behind the reflecting mirror on a windshield. Accordingly, even if the meter indicator is located at any position other than the meter hood, the meter hood is yet necessary to prevent the reflection of the image from the warning lamps on the windshield.

SUMMARY OF THE INVENTION

It is therefore an object of the present invention to provide an indication display unit for vehicles which may eliminate a meter hood and ensure a more space in the dash board.

In accordance with the present invention, there can be provided an indication display unit for vehicles comprising a reflecting member having an electric unit, a supporting member having a connecting portion electrically connectable with or disconnectable from the above electric unit and removably holds the reflecting member at the position of the instrument panel of a dash board with the reflecting surface thereof directed towards a driver's seat, and an indicating device located at any position other than the dash board to project the displayed images on the indicating surfaces towards the reflecting surface of the reflecting member.

With the constitution as described above, since all the indicated image reflected in the range of the reflecting surface of the reflecting member is formed in such a manner that an erect virtual image of the displayed image formed on the back side of the reflecting member may be visibly observed by the driver, and that the indicating device is located at the part other than the dash board, then, even when a position of the dash board at the position of the instrument panel is reflected on the windshield, the reflected images are not observed by the driver, whereby it is unnecessary to provide a meter hood.

Since the electric device provided to the reflecting member is removable, a space for mounting the electric device need not be newly obtained in the case where the desired electric device or the like is mounted.

The features of the invention will be more fully understood from the following description and appended claims when examined in accordance with the accompanying drawings.

DETAILED DESCRIPTION OF THE PREFERRED EMBODIMENTS

FIGS. 1 to 10 show an embodiment according to the present invention, in which reference numeral 10 designates the windshield of a vehicle, 12 a dash board, and 14 a steering wheel respectively.

The dash board 12 is projected from the lower side edge of the windshield 10 inwardly of a compartment, and a substantially horizontal upper surface 121 thereof is arcuately cut out at a portion opposite to a driver's seat to form a recessed portion 122.

On the recessed portion 122 are mounted a pair of supporting members 18 having internally a jack 18a as an electric connecting member. A reflecting member 16 for reflecting an indicating image from an indicating unit which will be hereinafter described is mounted on the supporting members 18 to thereby provide an arrangement wherein the reflecting surface 161 of the reflecting member 16 is directed to the driver's seat at a position corresponding to an instrument panel of the dash board 12.

Figure 8:
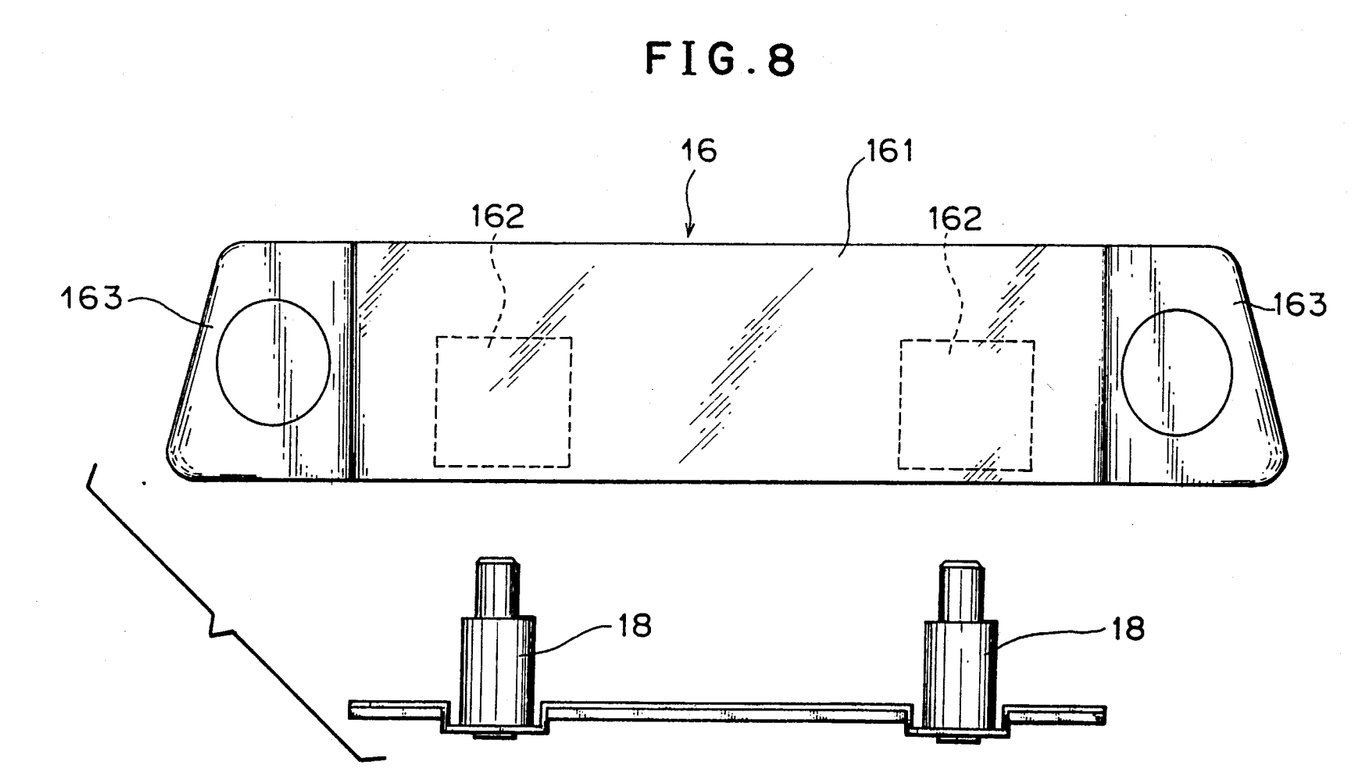
FIG. 8 is a front view showing the reflecting member in a preferred embodiment.
Figure 9:
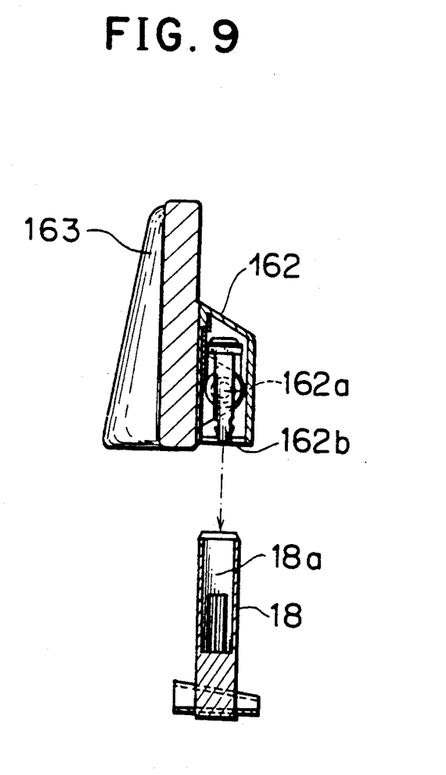
FIG. 9 is a side view showing the reflecting member.
Figure 10:
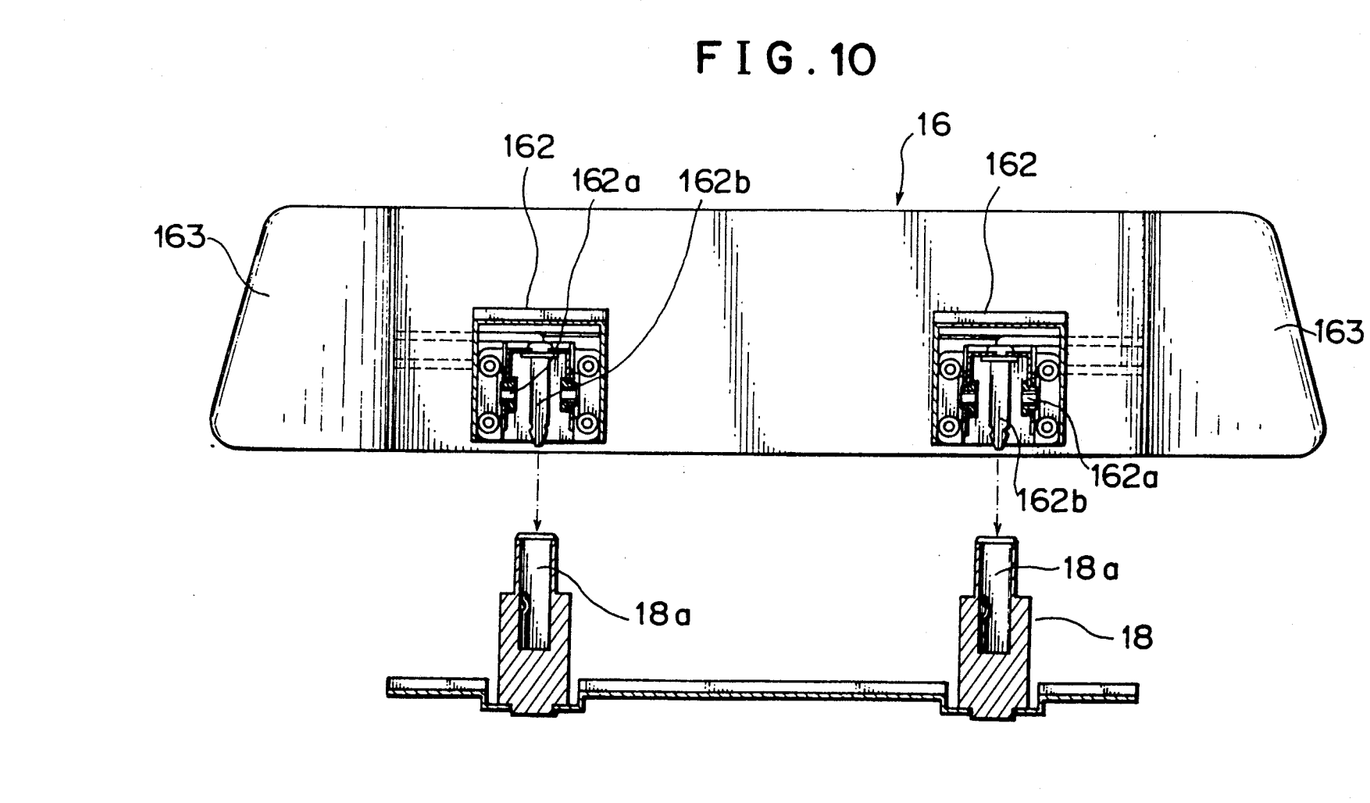
FIG. 10 is a rear view showing the reflecting member.

The reflecting member 16 is in the substantially rectangular shape in such a manner that longer sides extend horizontally. The reflecting surface thereof 161 is slightly concave along the lateral sides, where a pair of symmetrical speakers 163 are provided opposing to each other, and the reflecting surface 161 is slightly inclined downwardly and supported.

Connection to the supporting members 18 is effected by a pair of connection portions 162 formed on a surface opposite to the reflecting surface 161 of the reflecting member 16, namely, a back surface.

Within the connecting portions 162 are disposed plugs 162b connected respectively to the pair of speakers 163 and rotatably supported at an angle of 2 to 3 degrees by means of pivotal shafts 162a. The plugs 162b are inserted into the jacks 18a of the supporting members 18 to provide the connection between the reflecting member 16 and the supporting members 18.

Thereby, the pair of speakers 163 of the reflecting member 16 are connected to output lines of audio signals (not shown) through the jacks 18a of the supporting members 18, and the inclination angle of the reflecting surface 161 can be adjusted within the range of 2 to 3 degrees.

Figure 1:
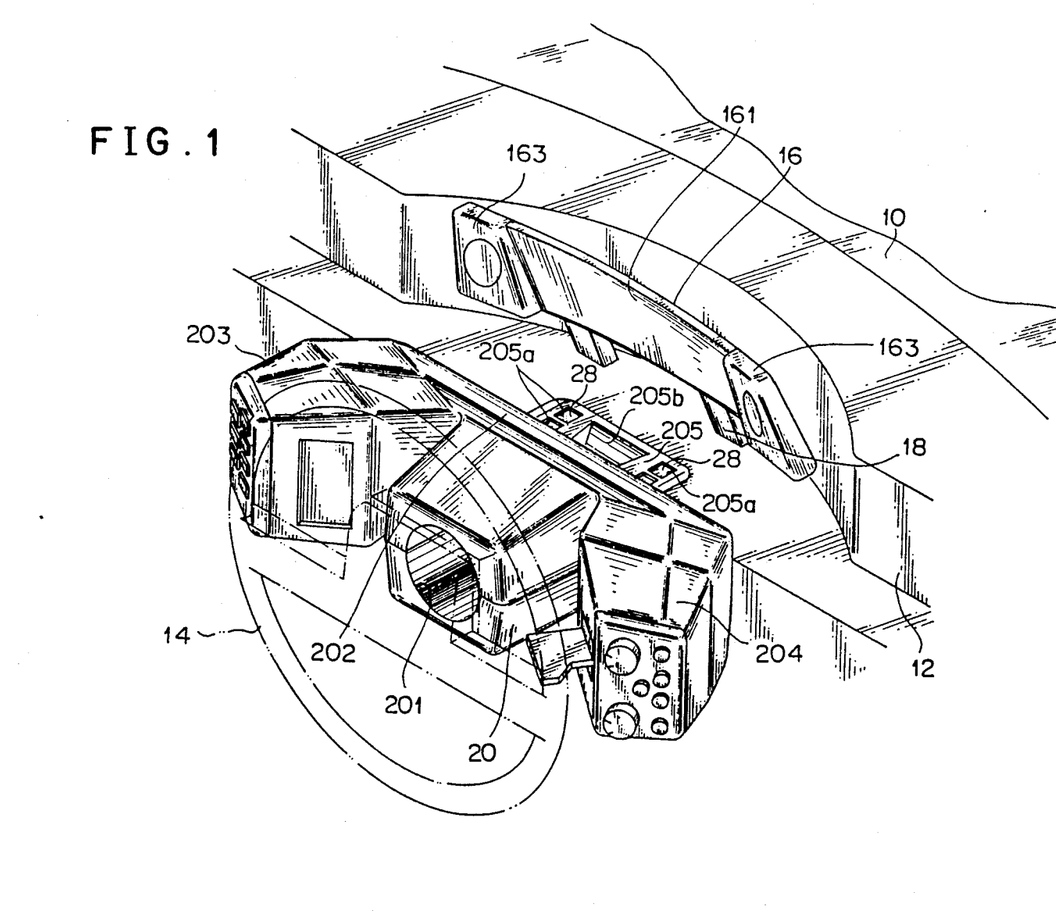
FIG. 1 is a perspective view showing an embodiment of the indication display unit for vehicles according to the present invention.
Figure 2:
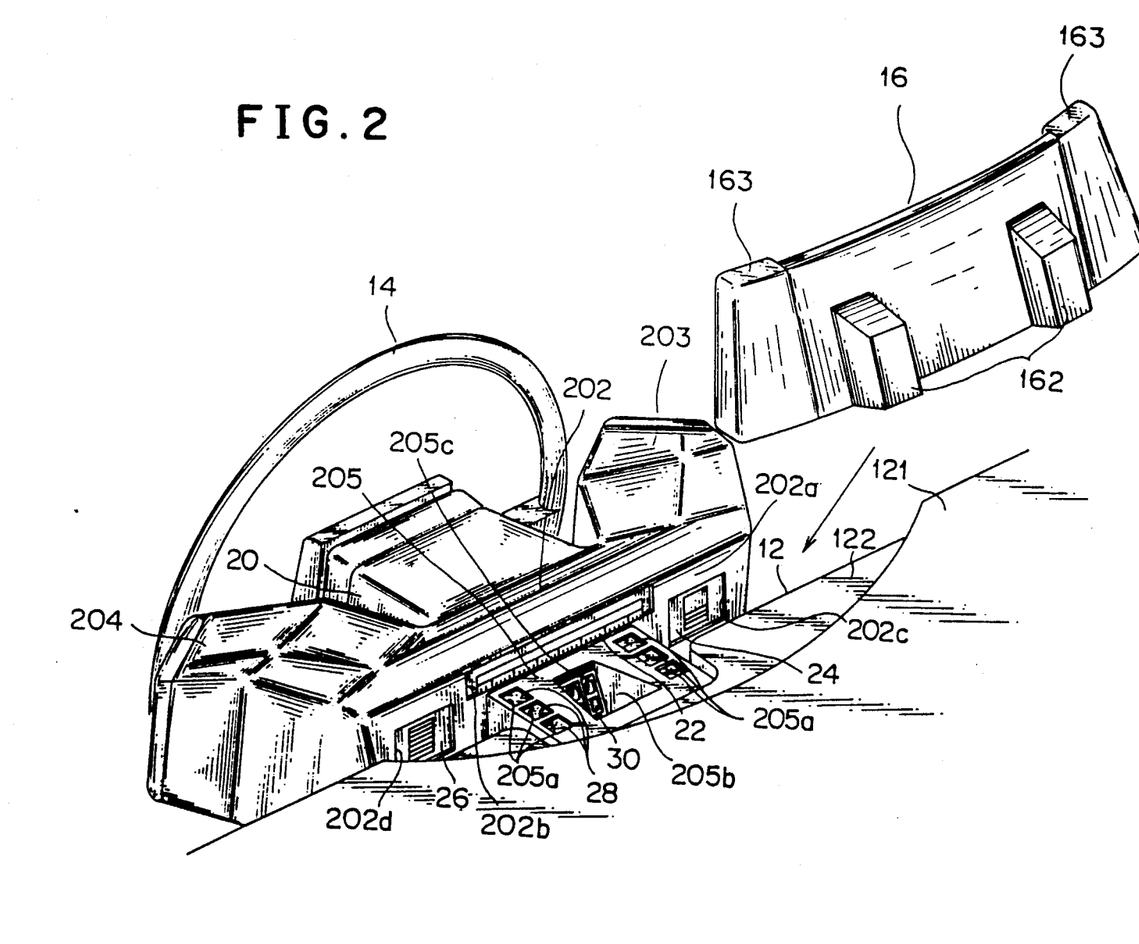
FIG. 2 is a partially exploded perspective view of the unit as viewed in a direction different from that in FIG. 1.
Figure 3:
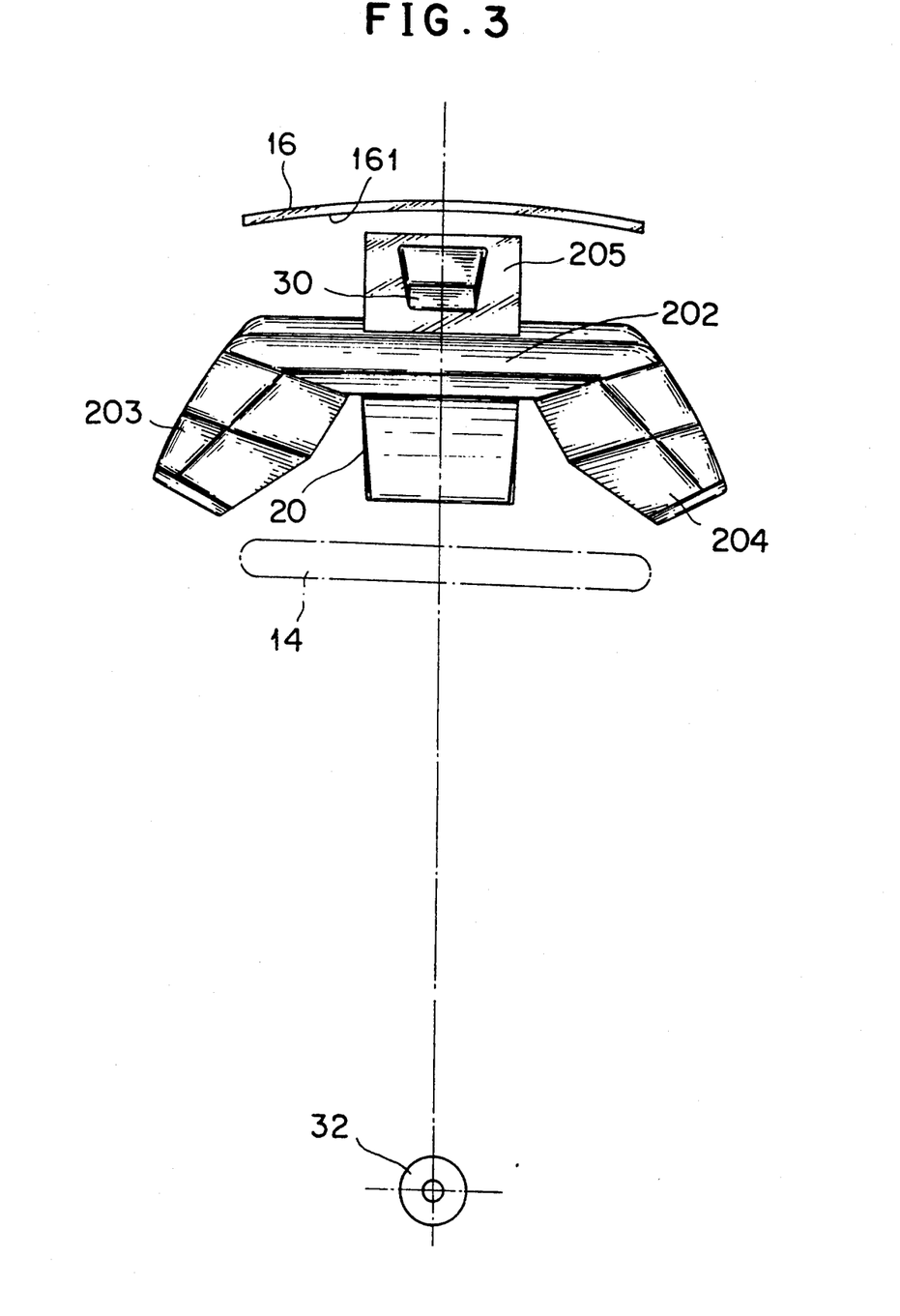
FIG. 3 is a top plan view of the unit shown in FIG. 1.
Figure 5:
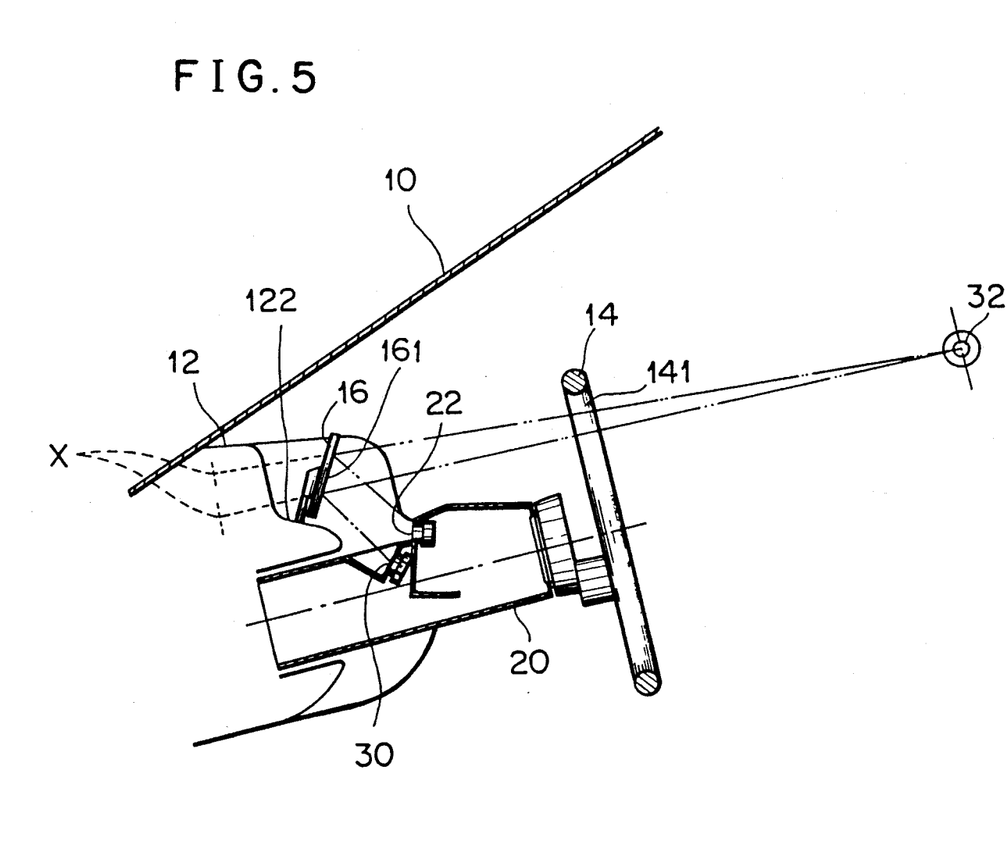
FIG. 5 is a sectional side view of the unit shown in FIG. 1.

Reference numeral 20 designates a steering column surrounding a steering shaft (not shown) for connecting the steering wheel 14 with a steering mechanism mounted in an engine compartment. The steering column 20 is formed at its central portion with an insertion hole 201 for inserting the steering shaft thereinto. The steering column 20 is slightly inclined downwardly to the front of the vehicle along the steering shaft 21, and front end portion of the steering column 20 on the opposite side of the steering wheel 14 is inserted into the dash board 12.

The rear portion of the steering column 20 on the steering wheel side has an uppermost surface of substantially equal level to the upper surface of the recessed portion 122 of the dash board 12. The upper surface of the rear portion of the steering column 20 is projected upwardly from the rear end thereof to the longitudinally central portion while maintaining the aforesaid level, at which the steering column 20 extends sidewardly in respectively opposite directions to form an indicator receiving portion 202. In addition, the indicator receiving portion 202 are further projected rearwardly at its lateral ends towards the steering wheel 14 to form switch receiving portions 203 and 204.

A surface 202a opposed to the reflecting surface 161 of the reflecting member 16 in the indicator receiving portion 202 is formed with openings through which indicating surfaces 22, 24 and 26 of different indicators fixedly received in the indicator receiving portion 202 are respectively exposed. More specifically, the indicating surface 22 exposed through the opening 202b is provided for an engine speed indicator designed to indicate the revolutional frequency of the engine in a bar-graph mode. The indicating surface 24 exposed through the opening 202c is provided for a water temperature, indicator and the indicating surface 26 exposed through the opening 202d is provided for a residual fuel quantity display.

Close to the dash board 12 of the handle column 20 is formed another indicator receiving portion 205 by the steering column 20 itself. The indicator receiving portion 205 is formed on its upper surface with two rows of openings 205a and a sectionally V-shaped recess 205b. Each row of openings 205a includes three openings arranged longitudinally of the upper surface of the indicator receiving portion 205 and through the openings 205a, a pluralities of indicating surfaces 28 for various warning indicators such as a door open warning indicator, seat belt, warning indicator and so on are exposed. The sectionally V-shaped recess 205 is formed on its inner surface opposed to the reflecting surface 161 of the reflecting member 16 with an opening 205c through which an indicating surface 30 of a vehicle speed indicator for indicating a vehicle speed is exposed.

These indicators received in the indicator receiving portions 202 and 205 and preferably constructed of a self-luminescent display using a fluorescent character display tube, light emitting diode or transmissive liquid crystal provided with a back light, for example.

The switch receiving portions 203 and 204 encase therein various switches, and operation buttons of these switches are arranged in the vicinity of the steering wheel 14 so that the operation buttons may be operated by any fingers of a hand put on the steering wheel 14.

Particularly, various column switches are encased in the switch receiving portion 204, and are adapted to be operated by a rearwindow defogger switch button 204a, hazard warning flash switch button 204b, parking switch button 204c, washer switch button 204d, light switch button 204e, wiper switch button 204f, turn signal switch lever the 204g, etc., which operate the aforesaid column switches. On the other hand, the switch receiving portion 203 encases therein various switches for operating an air conditioner, radio and navigation device mounted on the vehicle and in the figure, there are shown four select switch buttons 203a, 203b, 203c and 203d and mode assigning switch buttons 203e, 203f and 203g for selecting the operations of the air conditioner, radio or navigation device when the select buttons are operated. Furthermore, the switch receiving portion 203 encases therein a dot-matrix indicator for indicating a function or the like of the select switch buttons 203a to 203d, and an indicating surface 203h thereof is directed to a driver.

Figure 4:
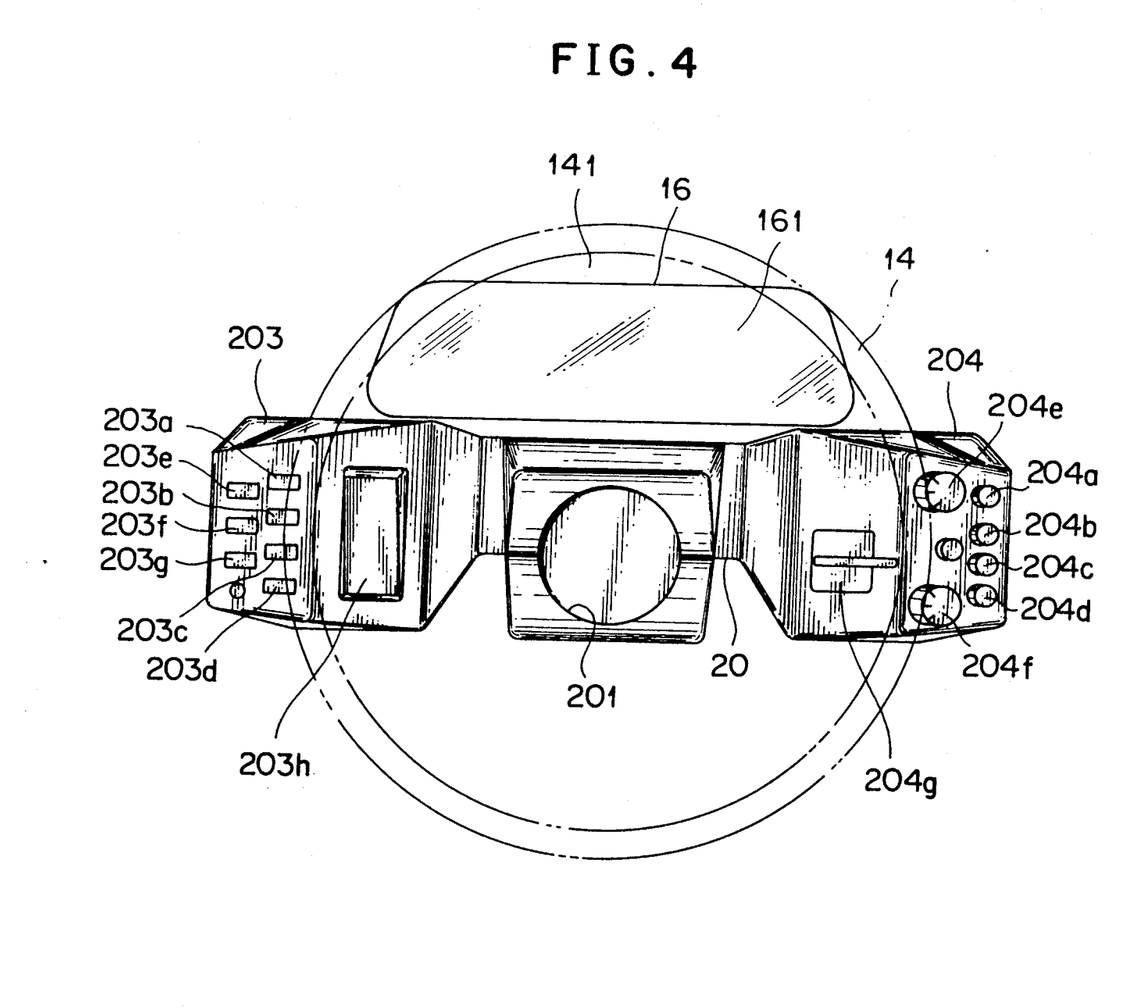
FIG. 4 is a front elevational view of the unit shown in FIG. 1.

With the constitution as described above, the driver seated on the driver's seat can view the reflecting surface 161 of the reflecting member 16 through an upper semi-circular vacancy 141 of the steering wheel 14, as shown in FIGS. 4 and 5. Accordingly, as shown in FIG. 5 the displayed image on the indicating surfaces 22, 24, 26, 28 and 30 are projected to the reflecting surface 161 of the reflecting member 16, and are reflected on the reflecting surface 161. The reflected images are visually observed by the eyes 32 of the driver through the vacancy 141 of the steering wheel 14. As a result, the driver can sight an erect virtual image X of the displayed image as formed at a predetermined position at the rear of the reflecting member 16.

Figure 6:
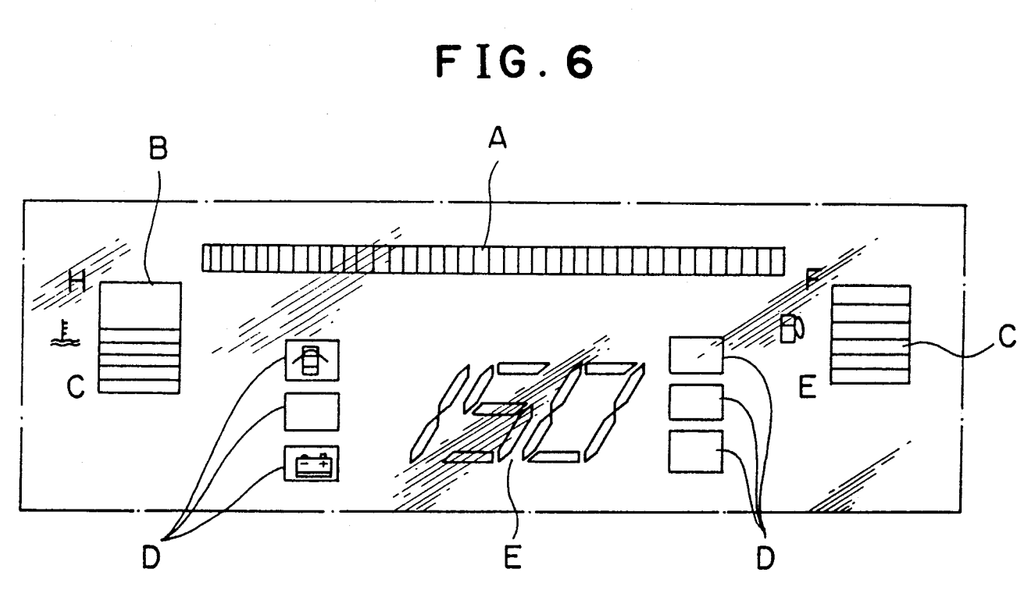
FIG. 6 is an exemplary illustration of the reflected image on the reflecting surface.

In relation to the arrangement of the aforementioned indicating surfaces 22 to 30, the indication capable of being sighted by the driver is within the range of the reflecting surface 161 of the reflecting member 16 as shown in FIG. 6. In the illustration shown in FIG. 6, reference characters A, B and C denote bar indications of the engine revolutions, water temperature and residual fuel quantity, respectively, and reference characters D and E designate indications of warnings and vehicle speed respectively.

In the aforementioned embodiment, only the reflecting member 16 is provided at the position of the instrument panel position of the dash board 12. All the indicated images reflected within the range of the reflecting surface 161 of the reflecting member 16 are formed in such a manner that an erect virtual image of the displayed image is formed on the back side of the reflecting member by the effect of the image projection from an indicating unit provided in the portion other than the dash board 12. Therefore, even when a position of the dash board at the position of the instrument panel is reflected on the windshield 10, the reflected images are not observed by the driver, whereby it is unnecessary to provide a meter hood.

Figure 7:
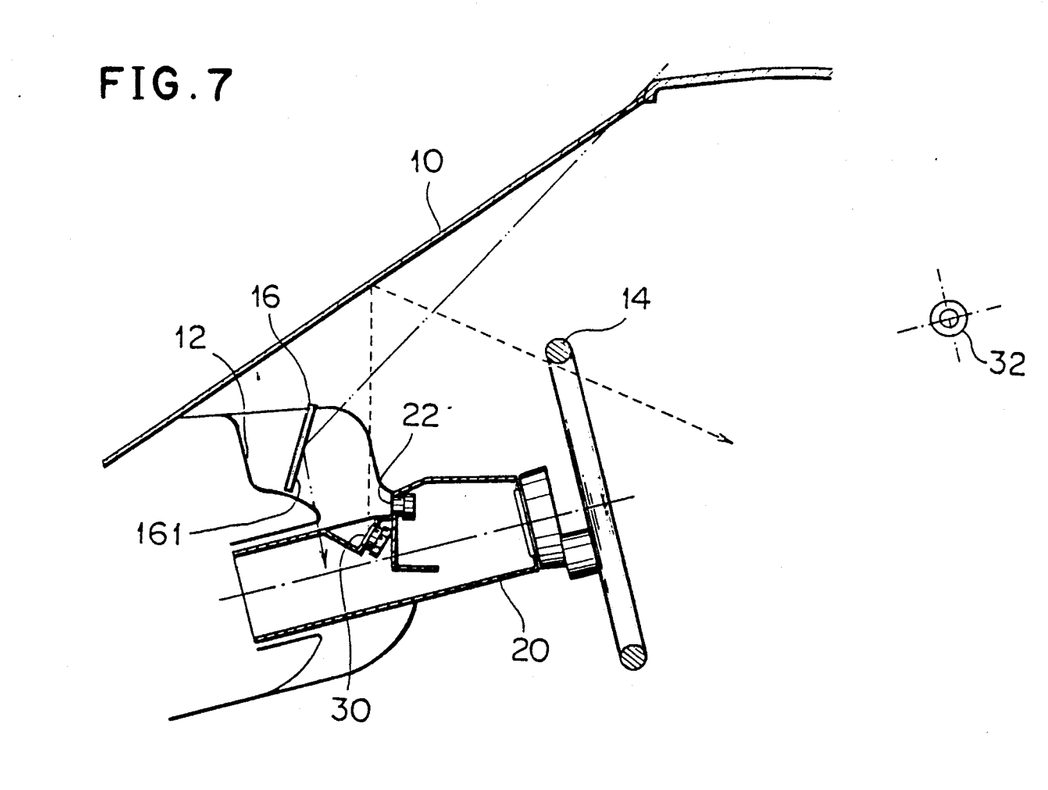
FIG. 7 is a view similar to FIG. 5, showing the effect of the preferred embodiment.

Furthermore, as shown in FIG. 7, even when external light enters the reflecting surface 161 of the reflecting member 16 through the windshield 10, reflected light from the reflecting surface 161 does not reach the driver's eyes 32. Further, even when the displayed images projected from the indicating surface 30, for example, are reflected on the windshield 10, the reflected images are not observed by the driver since a direction of reflection is widely offset from the driver's eyes 32.

On the other hand, since the connecting portion 162 and supporting member 18 are constituted as described above and are detachable, other reflecting member provided with a plug having the same shape as the plug 162b can be mounted on the supporting member 18 in a manner similar to the above.

For example, a film speaker maintained in a fixed shape by a frame can be used, the reflecting surface thereof being formed by vapor deposition or the like. In this case, the reflecting surface is preferably formed into a recessed surface slightly concave along the lateral sides similarly to the reflecting member 16.

The pair of speakers 163 mounted on the reflecting member 16 are symmetrically positioned at lateral ends forwardly of the driver together with the reflecting surface 161, and since the speakers 163 are preferably positioned from the acoustic characteristic's point of view, which is unlike the conventional speakers normally disposed on the sides of the compartment, the distance from each speaker to the driver's seat being different. Therefore, an excellent acoustic effect can be obtained by these pair of speakers 163.

Figure 11:
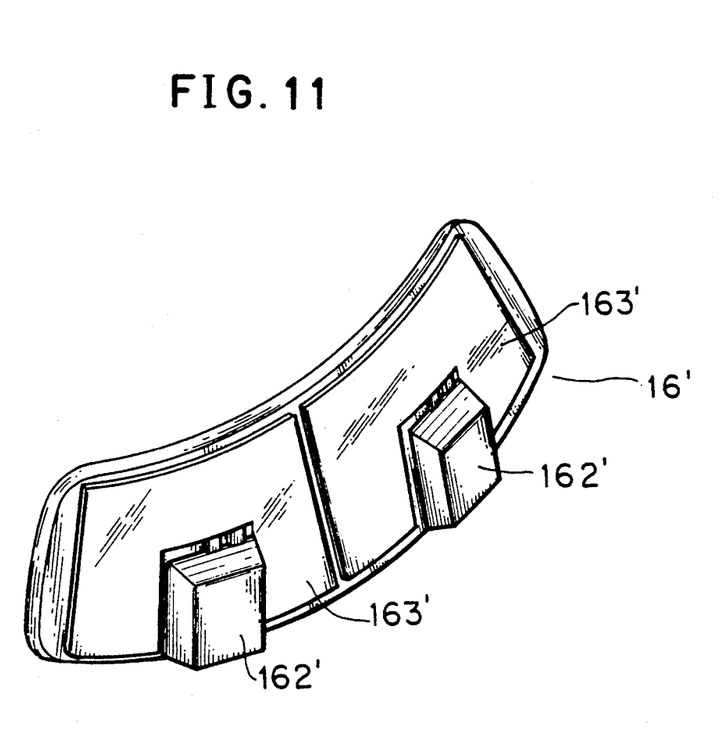
FIG. 11 is a perspective view showing another embodiment of the reflecting member.
Figure 12:
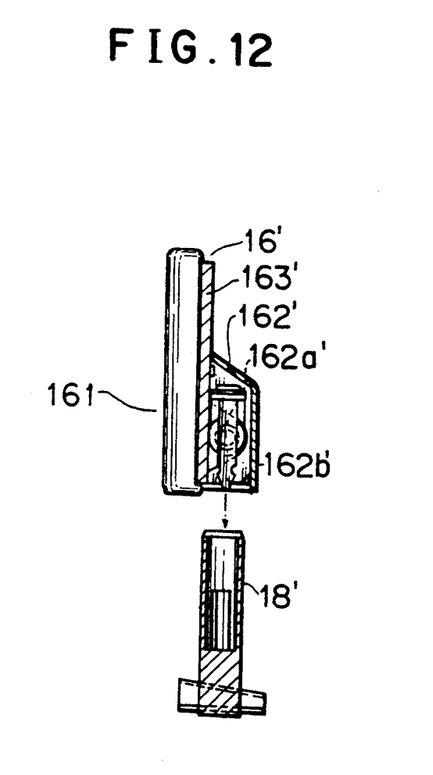
FIG. 12 is a side view of the reflecting member shown in FIG. 11.
Figure 13:
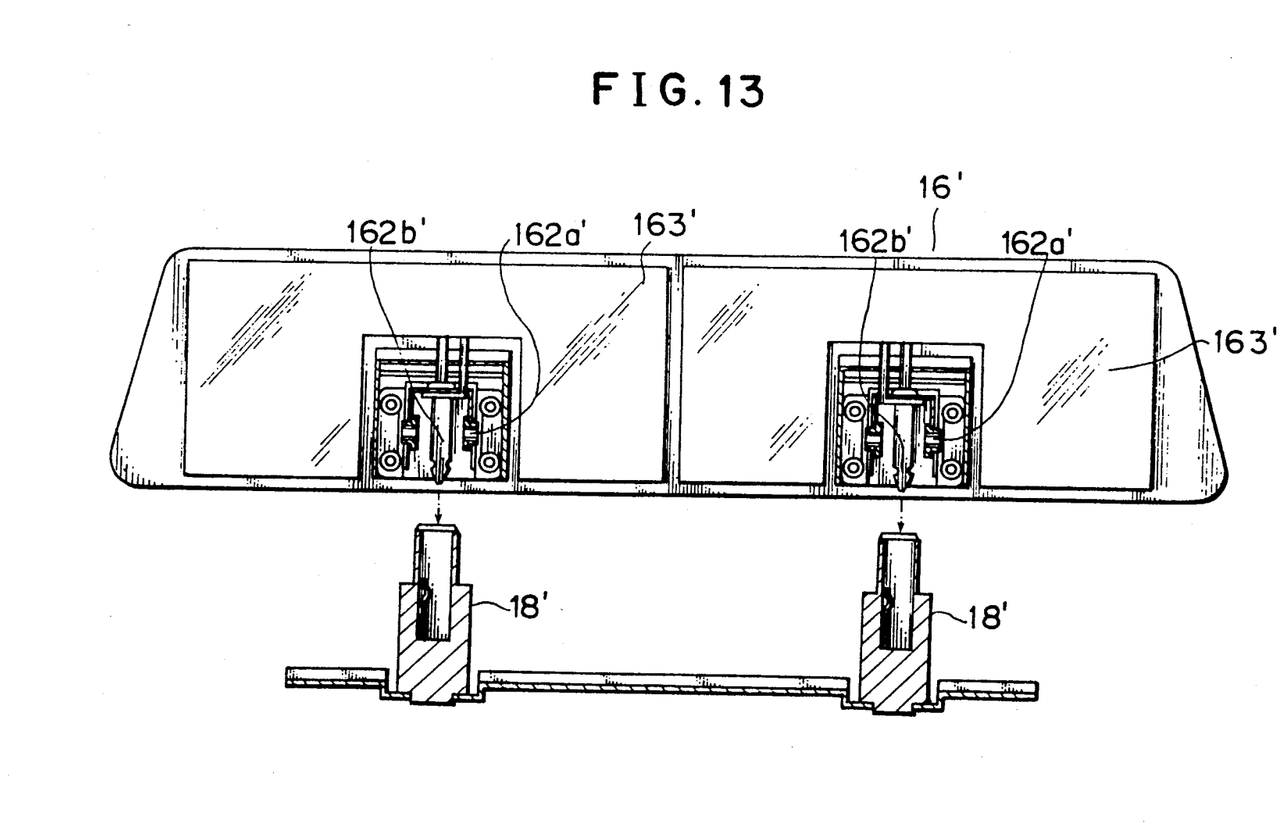
FIG. 13 is a rear view of the reflecting member.

FIGS. 11 to 13 show another embodiment of a reflecting member provided with an electric unit, wherein FIG. 11 is a perspective view, FIG. 12 a side view, and FIG. 13 a back view.

As shown in the figures, a solar cell 163' in addition to a connecting portion 162' is disposed at the rear of a reflecting member 16', and an output line of the solar cell 163' is connected to a plug 162b' rotatably supported by a pivotal shaft 162a'.

When the reflecting member 16' is installed on a supporting member 18' on the dash board, the solar cell 163' is settled facing to the windshield 10. When an external light is irradiated through the windshield 10, an electromotive force is produced in the solar cell 163'.

The electric power of the solar cell 163' functions to compensate for the lowered electromotive force caused by self-discharge of batteries loaded on the vehicle.

It is noted that if two kinds of jacks individually removable from each of the plugs; the plug 162b connected to the speaker 163 and the plug 162b' connected to the solar cell 163', are provided within the supporting member; the reflecting member 16 provided with the speaker 163 can be replaced by the reflecting member 16' provided with the solar cell 163' if required.

The indication display unit according to the present invention which has been described in detail above has the following effects.

According to the present invention, the reflected image on the windshield may be sighted by the driver without a meter hood. Therefore, meter hood can be eliminated. At the instrument panel position, only the reflecting member provided with the electric device is present without any indicator, so that a large space can be ensured in the dash board. In addition, since no meter hood is present, a space ahead of the driver can be sufficiently ensured, thus providing a favorable driving environment for the driver.

Furthermore, since the electric unit mounted on the reflecting member is removable, a space to be occupied by the electric unit need not be newly obtained in the case where the desired electric device or the like is mounted.

Moreover, since the reflecting member and the dash board are detachable, a plurality of reflecting members with electric units having different functions can be replaced for use.

What is claimed is:

1. An indication display unit for a vehicle, said indication display unit displays information about driving conditions of said vehicle, said indication display unit comprising:

reflecting means having an electric unit, said reflecting means mounted inside a recessed portion of a dash board at a position of an instrument panel for observing said information which is displayed inside said recessed portion, said reflecting means having connecting portions projecting outward from a surface opposite to a reflecting surface, each connecting portion having a hollow portion, each connecting portion having a) a pivotal shaft, disposed in said hollow portion, for rotatably supporting said reflecting means, and b) a plug, disposed in each hollow portion, connected to said electric unit;

supporting means having a connecting portion electrically connectable with and disconnectable from said electric unit, said reflecting means removably mounted on said supporting means with a reflecting surface thereof directed to a driver's seat; and indicating means located at any position other than said dash board with an indicating surface thereof directed to said reflecting surface so as to project said information, indicated on said indicating surface, to said reflecting surface.

2. An indication display unit according to claim 1 wherein said indicating means is located on a steering column of said vehicle.

* * * * *